(12) United States Patent
Vasekin et al.

(10) Patent No.: US 7,447,883 B2
(45) Date of Patent: Nov. 4, 2008

(54) ALLOCATION OF BRANCH TARGET CACHE RESOURCES IN DEPENDENCE UPON PROGRAM INSTRUCTIONS WITHIN AN INSTRUCTION QUEUE

(75) Inventors: Vladimir Vasekin, Cambridge (GB); Stuart David Biles, Little Thurlow (GB); Andrew Christopher Rose, Cambridge (GB); Wilco Dijkstra, Cambridge (GB)

(73) Assignee: ARM Limited, Cambridge (GB)

( * ) Notice: Subject to any disclaimer, the term of this patent is extended or adjusted under 35 U.S.C. 154(b) by 137 days.

(21) Appl. No.: 11/501,920

(22) Filed: Aug. 10, 2006

(65) Prior Publication Data

US 2008/0040592 A1 Feb. 14, 2008

(51) Int. Cl.
*G06F 9/32* (2006.01)
(52) U.S. Cl. .................................................. 712/238
(58) Field of Classification Search .......... 712/237–238
See application file for complete search history.

(56) References Cited

U.S. PATENT DOCUMENTS 4,926,323 A * 5/1990 Baror et al. .................. 712/238
RE35,794 E * 5/1998 Johnson ...................... 712/239
6,609,194 B1 * 8/2003 Henry et al. ................ 712/238

* cited by examiner

*Primary Examiner*—Richard Ellis
(74) *Attorney, Agent, or Firm*—Nixon & Vanderhye P.C.

(57) ABSTRACT

A data processing system includes an instruction fetching circuit 2, an instruction queue 4 and further processing circuits 6. A branch target cache, which maybe a branch target address cache 8, a branch target instruction cache 10 or both, is used to store branch target addresses or blocks of instructions starting at the branch target respectively. A control circuit 12 is responsive to the contents of the instruction queue 4 when a branch instruction is encountered to determine whether or not storage resources within the branch target cache 8, 10 should be allocated to that branch instruction. Storage resources within the branch target cache 8, 10 will be allocated when the number of program instructions within the instruction queue is below a threshold number and/or the estimated execution time of the program instructions is below a threshold time.

32 Claims, 4 Drawing Sheets

ALLOCATION OF BRANCH TARGET CACHE RESOURCES IN DEPENDENCE UPON PROGRAM INSTRUCTIONS WITHIN AN INSTRUCTION QUEUE

BACKGROUND OF THE INVENTION

1. Field of the Invention

This invention relates to the field of data processing systems. More particularly, this invention relates to the control of branch target caches within data processing systems.

2. Description of the Prior Art

It is known within computer programs to incorporate branch instructions which redirect program flow from one point to another point. When such programs are executed in systems which prefetch program instructions it is desirable to redirect the prefetching activity to the branch target rapidly in order that there should not be an underflow in the program instructions available to be fed to the remaining parts of the data processing system for execution. However, it takes a finite amount of time to identify a branch instruction that has been fetched and determine whether or not it will actually be executed within the pipeline system. This tends to introduce a pipeline "bubble" where the latency associated with accessing the program instructions from memory will delay the return of the first instructions from the target address of the branch for a certain period during which no program instructions will be available to be fed to the rest of the data processing system. In some data processing systems an instruction queue is employed between the prefetching mechanism and the remainder of the data processing system to provide a small buffer of program instructions to be executed.

An additional mechanism that is known is the use of branch target address caches (BTACs) and branch target instruction caches (BTICs). A BTAC operates by detecting that a program instruction is being fetched from an address where a branch instruction was previously encountered and for which a branch target address of the previously encountered branch instruction has been stored. The BTAC can issue this cached target address to the prefetch unit to redirect program fetching to that target address working on the presumption that the branch instruction previously encountered will be present again and will act to redirect program flow to the same point executed.

The BTIC mechanism is similar except a sequence of program instructions starting from the target address of a previously encountered branch instruction is stored within the cache and available to be issued into the instruction queue and pipeline when the branch instruction previously encountered again. Caching the instructions at the branch target in this way enables them to be rapidly made available for issue to the instruction pipeline and avoid "bubbles" introduced by the latency of the memory system from which program instructions from the new location must be fetched.

Whilst the BTAC and BTIC approaches have many advantages, they do have the disadvantage of consuming relatively large number of gates in their implementation. These gates in turn consume electrical power in a disadvantages manor. Thus, the provision of BTAC and BTIC capabilities represents and overhead in terms of cost, complexity, power consumption and the like which must be balanced against the advantages which they provide.

SUMMARY OF THE INVENTION

Viewed from one aspect of the present invention provides apparatus for processing data, said apparatus comprising:

an instruction fetching circuit coupled to a memory storing program instructions to be executed;

an instruction queue coupled to said instruction fetching circuit to receive and to store at least representations of program instructions fetched from said memory by said instruction fetching circuit;

a further processing circuit coupled to said instruction queue to receive said at least representations of program instructions from said instruction queue;

a branch target cache coupled to at least said instruction fetching circuit and responsive to a memory address associated with a program instruction fetched from said memory by said instruction fetching circuit to identify said program instruction as a previously encountered branch program instruction and to provide data concerning said previously encountered branch instruction to at least one of said instruction fetching circuit and said instruction queue; and a control circuit coupled to said branch target cache and said instruction queue and responsive to said at least representations of program instructions stored within said instruction queue to determine whether or not to store data within said branch target cache concerning a branch instruction fetched by said instruction fetching circuit.

The present technique recognises that it is important to make the best use of the branch target cache resources which are implemented. In particular, the present technique recognises that when an instruction queue is present (which may store the program instructions themselves or representations of them in another form, e.g. Thumb/Thumb2 to ARM), a reliable indicator of whether or not it is worthwhile dedicating capacity within a branch target cache to an encountered branch instruction can be derived from the program instructions stored within the instruction queue at the time at which branch target instruction was encountered. For example, if the instruction queue contains a large number program instructions or program instructions, which will take a relatively long time to execute, then it will generally not be worthwhile dedicating branch target cache capacity to such an encountered branch instruction at that time since any program instructions fetched from the memory and incurring the associated latency will in any case be returned before they are required by the rest of the system. This technique allocating branch target cache resources to an encountered branch instruction in dependence upon the program instructions within the instruction queue at that point in time recognises that when that branch instruction is encountered again then it is highly likely that the instruction queue will contain the same program instructions since the program flow immediately preceding the branch instruction will with a high probability be repeated. Thus, if no "bubble" or delay is incurred by the branch instruction when it is first encountered, then it is unlikely such a delay will be incurred when it is encountered again and the finite resources of the branch target cache will be better employed in storing data concerning other branch instructions.

It will be appreciated that the present technique is applicable to both branch target instruction caches and branch target address caches. In both case, the present technique increases the effectiveness of the use of the finite storage capabilities of these caches. This can be exploited to yield a higher level of performance by making better use of the cache resources available, or by enabling fewer cache resources to be provided and still maintain a given level of performance with an associated saving in gate count, power, cost etc.

In many practical systems program instructions are fetched as blocks of program instructions, of fixed or variable length program instructions, and the memory address which is associated with that fetched block of program instructions is used to determine if there is a match in the branch target cache indicative of a branch instruction being present within that block of program instructions when it was previously fetched. In this context, it is useful to store an index value indicating where the branch instruction is located within a block of program instructions as previously encountered.

One relatively straightforward way of using the program instructions within the instruction queue to control branch target cache resource allocation is to determine the number of program instructions present within the instruction queue and compare this with a threshold value. If fewer than the threshold value are present, then this indicates that an underflow may occur and accordingly branch target cache resources could usefully be deployed for that branch instruction. Conversely, if a relatively large number of program instructions are present, then it would likely not be worthwhile to allocate branch target cache resources to that branch instruction.

A more sophisticated technique, which is still relatively readily achievable with an acceptable amount of logic, is to at least partially decode the program instructions held within the instruction queue to estimate an execution time for those program instructions and then either allocate or not allocate branch target cache resources in dependence upon whether that estimated execution time is below or above a threshold time. Thus, even if relatively few program instructions are present within the instruction queue, but these are program instructions of a type which will take many cycles to execute, then allocation of branch target cache resources can be suppressed since there will be sufficient time to fetch the target instructions without having to rely upon the branch target cache.

In the context of a system in which multiple instruction issue is supported, the control circuit can estimate which program instructions will be issued together when determining its estimate of the execution time and thereby improve the accuracy of this estimation. This estimation can use relatively simple techniques, such as determining whether the registers being referred to are all different and accordingly likely to allow the instructions to be issued together without interlock problems.

Viewed from another aspect the present invention provides apparatus for processing data, said apparatus comprising:

instruction fetching means coupled to a memory means for storing program instructions to be executed;

instruction queue means coupled to said instruction fetching circuit for receiving and storing at least representations of program instructions fetched from said memory means by said instruction fetching means;

further processing means coupled to said instruction queue means for receiving said at least representations of program instructions from said instruction queue means;

branch target cache means coupled to at least said instruction fetching means and responsive to a memory address associated with a program instruction fetched from said memory means by said instruction fetching means for identifying said program instruction as a previously encountered branch program instruction and to provide data concerning said previously encountered branch instruction to at least one of said instruction fetching means and said instruction queue means; and a control means coupled to said branch target cache means and said instruction queue means and responsive to said at least representations of program instructions stored within said instruction queue for determining whether or not to store data within said branch target cache concerning a branch instruction fetched by said instruction fetching circuit.

Viewed from a further aspect the present invention provides a method of processing data processing data, said method comprising the steps of:

fetching program instructions to be executed;

storing at least representations of said program instructions within an instruction queue;

further processing said stored at least representations of program instructions;

in response to a memory address associated with a program instruction fetched, identifying said program instruction as a previously encountered branch program instruction and accessing data concerning said previously encountered branch instruction; and in response to said at least representations of program instructions stored, determining whether or not to store data concerning a branch instruction fetched.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
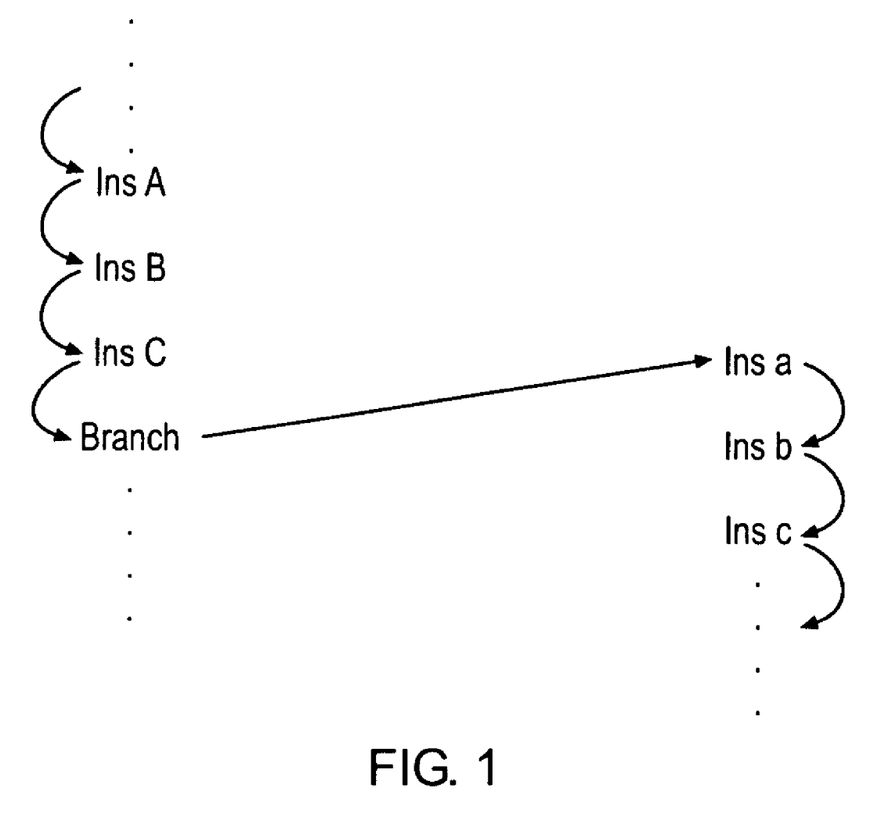
FIG. 1 schematically illustrates a sequence of program instructions subject to a branch instruction redirecting the program flow.

FIG. 1 illustrates a sequence of program instructions A, B, C being executed in turn until a branch instruction is encountered. This branch instruction maybe an unconditional branch instruction or a conditional branch instruction. The branch instruction triggers a redirection of program flow to a different memory address. The sequence of program instructions then executed is a, b, c. If the system is employing instruction prefetching, then it is desirable to use branch prediction mechanisms to determine whether or not a conditional branch instruction will or will not be taken. Such branch prediction techniques can be usefully employed in conjunction with the allocation control techniques of the branch target caches as described below. Unconditional branch instructions will always be taken and accordingly do not require prediction, but may nevertheless benefit from provision of branch target address caches or branch target instruction caches.

Figure 2:
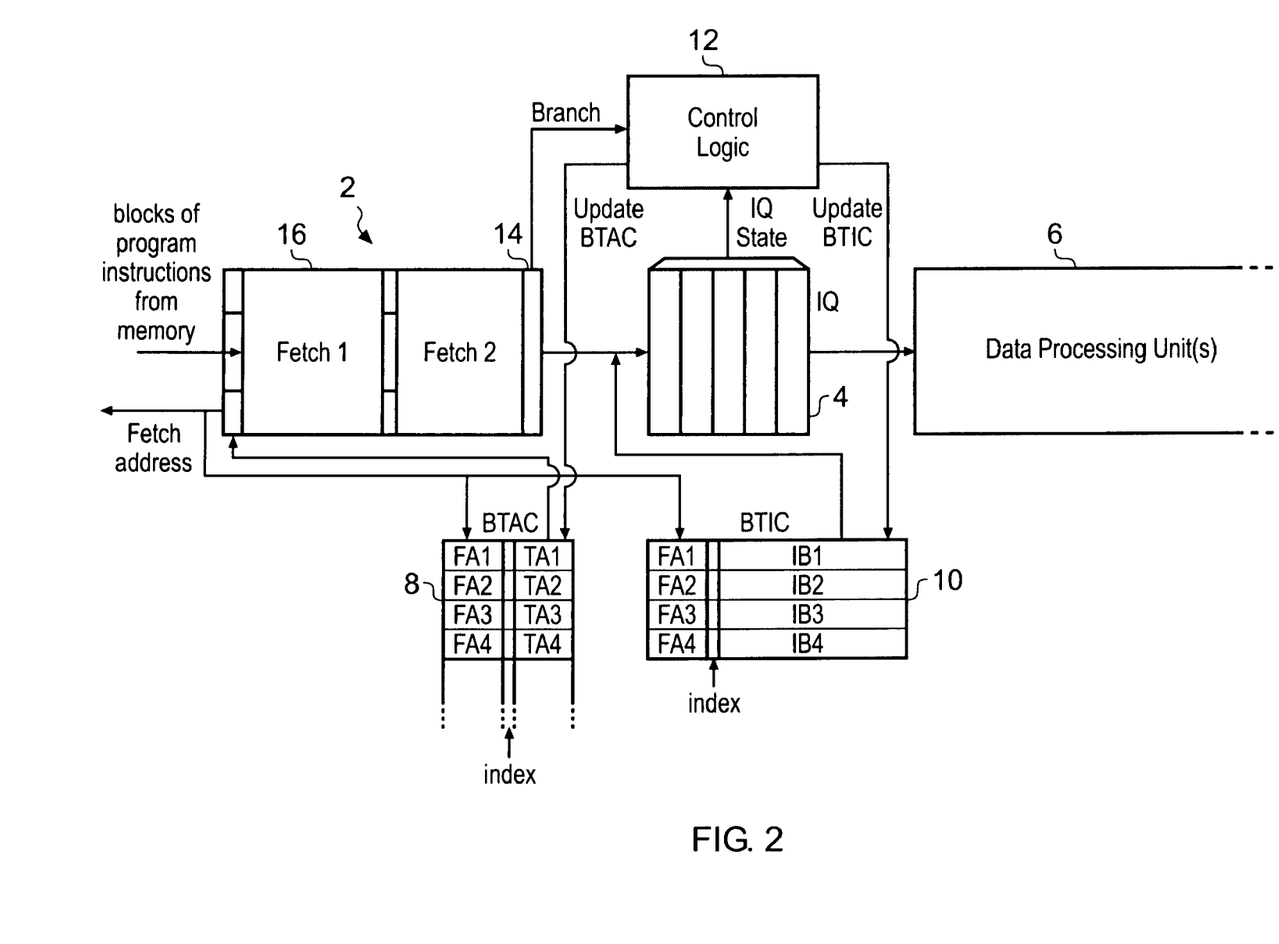
FIG. 2 schematically illustrates a portion of a data processing system having a prefetch unit, an instruction queue and further data processing circuits in association with a branch target address cache and a branch target instruction cache.

FIG. 2 illustrates a portion of a data processing system including an instruction prefetching unit 2, an instruction queue 4 and further processing circuits 6. The further processing circuit 6 maybe execution stages of an instruction pipeline for performing ALU or other processing operations in response to the program instructions supplied thereto from the instruction queue 4. A branch target address cache (BTAC) 8 and a branch target instruction cache (BTIC) 10 are provided and subject to control of the allocation of their resources by control logic 12. The instruction queue 4 can store the fetched program instructions themselves or some other representation thereof, e.g. Thumb/Thumb2 instructions translated to ARM instructions. Some instructions such as ITs or NOPs can be removed from the instruction stream or complex instructions expanded.

The prefetch unit 2 fetches blocks of program instructions, in this example 64-bit blocks, which can contain two 32 bit instructions, four 16 bit instructions, or a mixture of 16 and 32 bit instructions, from a memory. The memory maybe a cache memory or some higher order memory system. The prefetch unit 2 issues a fetch address to the memory system indicating the position of a block of program instructions to be fetched.

When the program instructions have progressed along the prefetched unit stages to register 14, they can be identified as a branch instruction by an at least partial decoding thereof. This identification is applied to the control logic 12.

The control logic 12 is then responsive to the state (e.g. the program instruction stored therein) of the instruction queue 4 to determine whether or not to update the contents of the BTAC 8 and the BTIC 10 to store data concerning the encountered branch instruction. The BTAC 8 stores a fetch address (FA) and a target address (TA) for encountered branch instructions. Thus, when a first stage 16 of the prefetch unit 2 issues a fetch address to the memory system which matches a fetch address stored within the BTAC 8, then this is recognised as corresponding to a block of instructions which previously held a branch instruction and accordingly it is assumed that another branch instruction will be found when that block of program instructions is returned. Accordingly, a target address (TA) stored in association with that fetch address is supplied to the first stage 16 of the prefetch unit 2 and used to redirect the fetch address to the branch target that was identified when the branch instruction was previously encountered. This early redirection of program flow reduces the likelihood of "bubbles" entering the pipeline.

The BTIC 10 is also responsive to the fetch address issued by the first stage 16 of the prefetch unit 2 and if a match occurs then a number of program instructions IB starting from the branch target address when the branch was previously encountered are returned from the BTIC and so keep the instruction queue supplied with program instructions and thereby avoid any underflow whilst fetching is redirected to the branch target address. Both the BTAC 8 and the BTIC 10 store an index value indicating the position within a block of program instructions fetched at which the previously encountered branch instructions was found such that this can be checked against the ultimately decoded block of program instructions to ensure that a branch instruction is indeed present at that same location and has been appropriately predicted.

The control logic 12 allocates storage space within the BTAC 8 and BTIC 10 when a branch instruction is identified in the register 14 in dependence upon the program instructions which are stored within instruction queue 4 at that time. Two examples of this control are described in association with FIGS. 3 and 4, although other examples are possible. It will also be appreciated that the present technique could be used in a system containing only one of the BTAC 8 or BTIC 10, as well as a system containing both of these elements.

Figure 3:
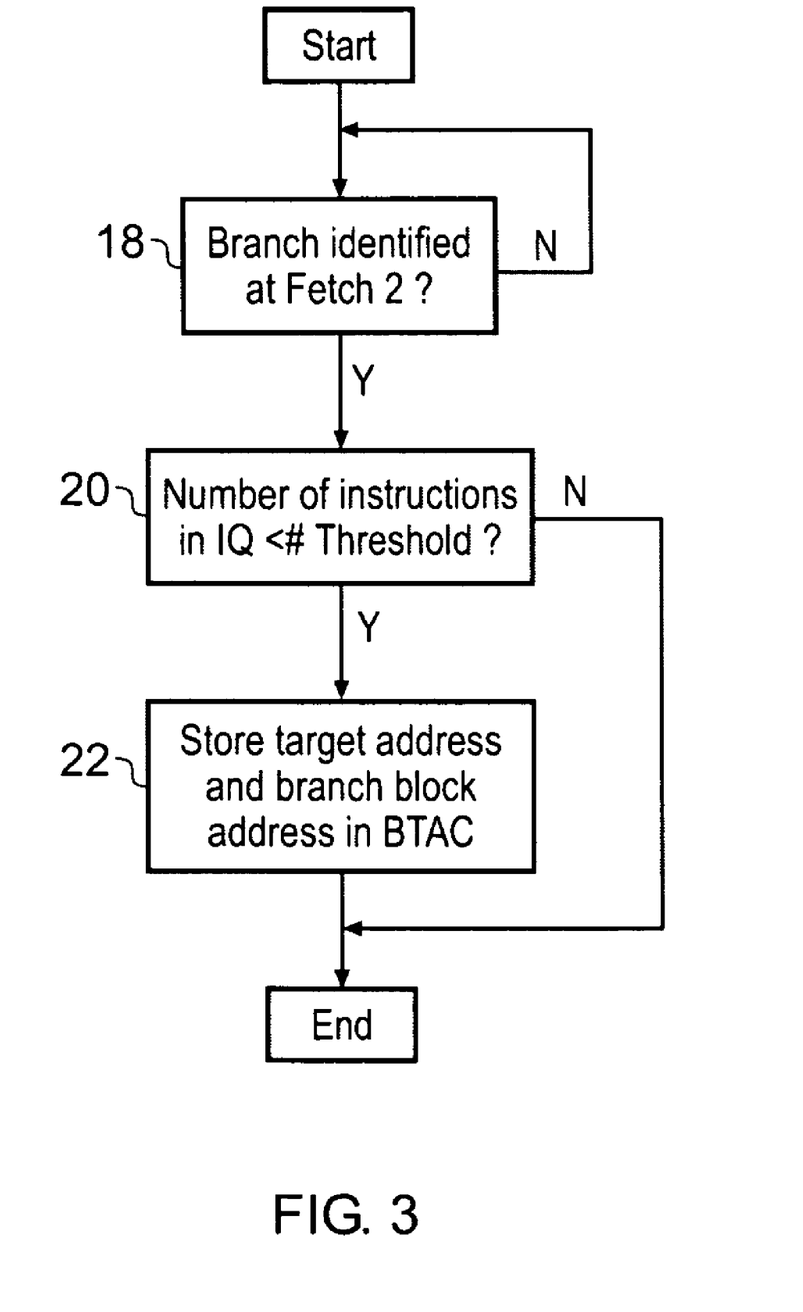
FIG. 3 is a flow diagram schematically illustrating one example of control of allocation of branch target address cache resources in dependence upon the instructions within the instruction queue.

FIG. 3 is a flow diagram showing the control performed by the control logic 12. At step 18 the control logic waits for a branch instruction to be identified in the register 14. When such a branch instruction is identified, the control logic 12 determines at step 20 how many instructions are currently held within the instruction queue and whether this is below a threshold number of instructions. If the determination is that the number of instructions is below this threshold number, then the processing proceeds to step 22 at which the target address for the identified branch instruction together with the fetch address for that branch instruction are stored within one of the storage locations within the BTAC 8. The determination that fewer than the threshold number of program instructions were present in the instruction queue 4 indicates that it is likely that unless BTAC 8 resources are used to cache data concerning that branch instruction and so permit more rapid program flow redirection, then an underflow will occur.

If the determination at step 20 was that above the threshold number of program instructions were present within the instruction queue 4 when the branch instruction identified at step 18 was encountered, then step 22 is bypassed and resources will not be allocated within the BTAC 8 to that branch instruction.

Figure 4:
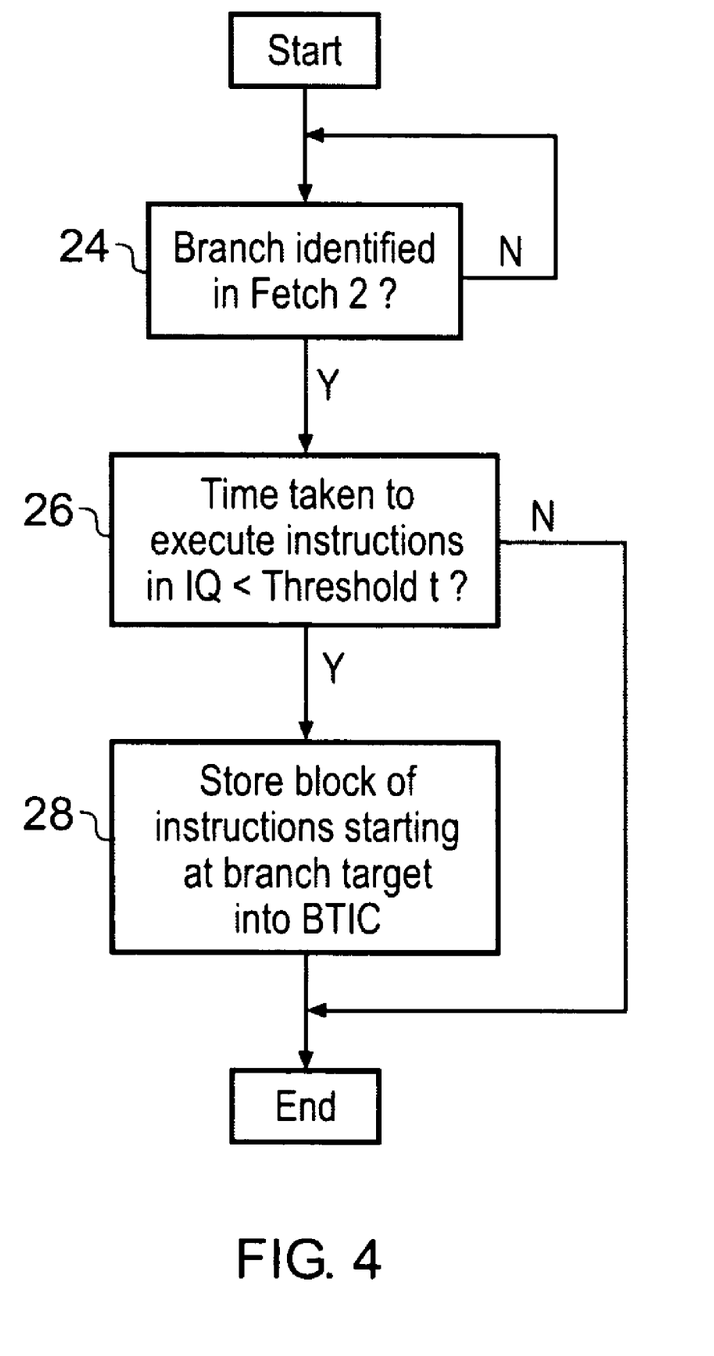
FIG. 4 is a further example of control of the allocation of resources within a branch target instruction cache in dependence upon the instruction within the instruction queue.

FIG. 4 illustrates a second example of control which maybe performed by the control logic 12. At step 24 the control logic waits for a branch instruction to be identified within the register 14. When such a branch instruction is identified, then step 26 is responsive to an at least partial decoding of the program instructions stored within the instruction queue 4 at that time to estimate an execution time for those program instructions when issued into the further processing circuit 6. Such an estimated time is then compared with a threshold time. The estimated time can be derived based upon the classes of instructions present, i.e. certain classes of instruction are known to take multiple cycles, such as long multiplies, multiple loads with long register lists, etc. If the further processing circuits 6 supports multiple instruction issue, e.g. a dual issue pipeline, then the execution time estimation can also estimate which instructions will be capable of parallel issue as this will affect the overall estimate of the execution time for the program instructions held within the instruction queue. Such an estimation of the ability for issue together need not be exact, since the control being performed is essentially statistical, and accordingly can be relatively simply implemented by techniques such as determining whether or not the registers being referenced with the program instructions are independent of one another.

If the determination at step 26 was that the time taken to execute the instructions held within the instruction queue 4 was less than a threshold time, then step 28 will allocate storage resources within the BTIC 10 to that branch instruction and accordingly will store a block of instructions, which could have a variety of lengths depending upon the latency of the memory system concerned, with these program instructions then being available to be placed into the instruction queue 4 whilst the program flow is being redirected when that branch instruction is encountered again.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data, said apparatus comprising:
   an instruction fetching circuit coupled to a memory storing program instructions to be executed;
   an instruction queue coupled to said instruction fetching circuit to receive and to store at least representations of program instructions fetched from said memory by said instruction fetching circuit;

a further processing circuit coupled to said instruction queue to receive said at least representations of program instructions from said instruction queue;

a branch target cache coupled to at least said instruction fetching circuit and responsive to a memory address associated with a program instruction fetched from said memory by said instruction fetching circuit to identify said program instruction as a previously encountered branch program instruction and to provide data concerning said previously encountered branch instruction to at least one of said instruction fetching circuit and said instruction queue; and a control circuit coupled to said branch target cache and said instruction queue and responsive to said at least representations of program instructions stored within said instruction queue to determine whether or not to store data within said branch target cache concerning a branch instruction fetched by said instruction fetching circuit, wherein said control circuit is responsive to said at least representations of program instructions stored within said instruction queue to determine if a storage condition is met and:

(i) if said storage condition is met, then said control circuit is configured to trigger said branch target cache to store said data concerning said branch instruction fetched by said instruction fetching circuit;

(ii) if said storage condition is not met, then said control circuit is configured not to trigger said branch target cache to store said data concerning said branch instruction fetched by said instruction fetching circuit, and wherein said control circuit determines a number of said at least representations of program instructions stored within said instruction queue and said storage condition corresponds to fewer than a threshold number being stored within said instruction queue.

2. Apparatus as claimed in claim 1, wherein said branch target cache comprises a branch target instruction cache configured to store one or more program instructions starting from a target address of said previously encountered branch instruction, said one or more program instructions being supplied to said further processing circuit from said branch target instruction cache following said previously encountered branch instruction.

3. Apparatus as claimed in claim 2, wherein said one or more program instructions are supplied to said further processing circuit from said branch target instruction cache via said instruction queue.

4. Apparatus as claimed in claim 1, wherein said branch target cache comprises a branch target address cache configured to store a target address of said previously encountered branch instruction, said target address being supplied to said instruction fetching circuit to direct fetching of program instructions to said target address following said previously encountered branch instruction.

5. Apparatus as claimed in claim 1, wherein said branch target cache stores data concerning a plurality of previously encountered branch instructions.

6. Apparatus as claimed in claim 1, wherein said instruction fetching circuit fetches blocks of program instructions from said memory and said memory address is associated with a block of program instructions and identifies that said block of program instructions contains a previously encountered branch instruction.

7. Apparatus as claimed in claim 6, wherein said branch target cache stores an index value indicating a position within said block of program instructions of said previously encounter branch instruction.

8. Apparatus for processing data, said apparatus comprising:

instruction fetching means coupled to a memory means for storing program instructions to be executed;

instruction queue means coupled to said instruction fetching circuit for receiving and storing at least representations of program instructions fetched from said memory means by said instruction fetching means;

further processing means coupled to said instruction queue means for receiving said at least representations of program instructions from said instruction queue means;

branch target cache means coupled to at least said instruction fetching means and responsive to a memory address associated with a program instruction fetched from said memory means by said instruction fetching means for identifying said program instruction as a previously encountered branch program instruction and to provide data concerning said previously encountered branch instruction to at least one of said instruction fetching means and said instruction queue means; and a control means coupled to said branch target cache means and said instruction queue means and responsive to said at least representations of program instructions stored within said instruction queue for determining whether or not to store data within said branch target cache concerning a branch instruction fetched by said instruction fetching circuit, wherein said control means is responsive to said at least representations of program instructions stored within said instruction queue means to determine if a storage condition is met and:

(i) if said storage condition is met, then said control means is configured to trigger said branch target cache means to store said data concerning said branch instruction fetched by said instruction fetching means;

(ii) if said storage condition is not met, then said control means is configured not to trigger said branch target cache means to store said data concerning said branch instruction fetched by said instruction fetching means, and wherein said control means determines a number of said at least representations of program instructions stored within said instruction queue means and said storage condition corresponds to fewer than a threshold number being stored within said instruction queue-means.

9. A method of processing data processing data, said method comprising the steps of:

fetching program instructions to be executed;

storing at least representations of said program instructions within an instruction queue;

further processing said stored at least representations of program instructions;

in response to a memory address associated with a program instruction fetched, identifying said program instruction as a previously encountered branch program instruction and accessing data concerning said previously encountered branch instruction; and in response to said at least representations of program instructions stored, determining whether or not to store data concerning a branch instruction fetched, wherein in response to said at least representations of program instructions stored within said instruction queue, determining if a storage condition is met and:

(i) if said storage condition is met, then triggering storing of data concerning said branch instruction fetched by said instruction fetching circuit;

(ii) if said storage condition is not met, then not triggering storing of data concerning said branch instruction fetched by said instruction fetching circuit, and wherein said determining determines a number of said at least representations of program instruction stored within said instruction queue and said storage condition corresponds to fewer than a threshold number being stored within said instruction queue.

10. A method as claimed in claim 9, wherein said data is stored within a branch target instruction cache configured to store one or more program instructions starting from a target address of said previously encountered branch instruction, said one or more program instructions being supplied from said branch target instruction cache for said further processing following said previously encountered branch instruction.

11. A method as claimed in claim 10, wherein said one or more program instructions are supplied for said further processing via said instruction queue.

12. A method as claimed in claim 9, wherein said data is stored within a branch target address cache configured to store a target address of said previously encountered branch instruction, said target address used to direct fetching of program instructions to said target address following said previously encountered branch instruction.

13. A method as claimed in claim 9, wherein data concerning a plurality of previously encountered branch instructions is stored.

14. A method as claimed in claim 9, wherein blocks of program instructions are fetched and said memory address is associated with a block of program instructions and identifies that said block of program instructions contains a previously encountered branch instruction.

15. A method as claimed in claim 14, wherein an index value is stored indicating a position within said block of program instructions of said previously encounter branch instruction.

16. Apparatus for processing data, said apparatus comprising:
an instruction fetching circuit coupled to a memory storing program instructions to be executed;
an instruction queue coupled to said instruction fetching circuit to receive and to store at least representations of program instructions fetched from said memory by said instruction fetching circuit;
a further processing circuit coupled to said instruction queue to receive said at least representations of program instructions from said instruction queue;
a branch target cache coupled to at least said instruction fetching circuit and responsive to a memory address associated with a program instruction fetched from said memory by said instruction fetching circuit to identify said program instruction as a previously encountered branch program instruction and to provide data concerning said previously encountered branch instruction to at least one of said instruction fetching circuit and said instruction queue; and
a control circuit coupled to said branch target cache and said instruction queue and responsive to said at least representations of program instructions stored within said instruction queue to determine whether or not to store data within said branch target cache concerning a branch instruction fetched by said instruction fetching circuit,
wherein said control circuit is responsive to said at least representations of program instructions stored within said instruction queue to determine if a storage condition is met and:
(i) if said storage condition is met, then said control circuit is configured to trigger said branch target cache to store said data concerning said branch instruction fetched by said instruction fetching circuit;
(ii) if said storage condition is not met, then said control circuit is configured not to trigger said branch target cache to store said data concerning said branch instruction fetched by said instruction fetching circuit, and
wherein said control circuit at least partially identifies said at least representations of program instructions stored within said instruction queue and at least estimates an execution time thereof and said storage condition corresponds to said execution time for said at least representations of program instructions within said instruction queue being less than a threshold time.

17. Apparatus as claimed in claim 16, wherein said branch target cache comprises a branch target instruction cache configured to store one or more program instructions starting from a target address of said previously encountered branch instruction, said one or more program instructions being supplied to said further processing circuit from said branch target instruction cache following said previously encountered branch instruction.

18. Apparatus as claimed in claim 17, wherein said one or more program instructions are supplied to said further processing circuit from said branch target instruction cache via said instruction queue.

19. Apparatus as claimed in claim 16, wherein said branch target cache comprises a branch target address cache configured to store a target address of said previously encountered branch instruction, said target address being supplied to said instruction fetching circuit to direct fetching of program instructions to said target address following said previously encountered branch instruction.

20. Apparatus as claimed in claim 16, wherein said branch target cache stores data concerning a plurality of previously encountered branch instructions.

21. Apparatus as claimed in claim 16, wherein said instruction fetching circuit fetches blocks of program instructions from said memory and said memory address is associated with a block of program instructions and identifies that said block of program instructions contains a previously encountered branch instruction.

22. Apparatus as claimed in claim 21, wherein said branch target cache stores an index value indicating a position within said block of program instructions of said previously encounter branch instruction.

23. Apparatus as claimed in claim 16, wherein said further processing circuit supports multiple instruction issue and said control circuit at least estimates which at least representations of program instructions stored within said instruction queue will be issue together when estimating said execution time.

24. Apparatus for processing data, said apparatus comprising:
instruction fetching means coupled to a memory means for storing program instructions to be executed;
instruction queue means coupled to said instruction fetching circuit for receiving and storing at least representations of program instructions fetched from said memory means by said instruction fetching means;
further processing means coupled to said instruction queue means for receiving said at least representations of program instructions from said instruction queue means;
branch target cache means coupled to at least said instruction fetching means and responsive to a memory address associated with a program instruction fetched from said memory means by said instruction fetching means for identifying said program instruction as a previously encountered branch program instruction and to provide data concerning said previously encountered branch instruction to at least one of said instruction fetching means and said instruction queue means; and a control means coupled to said branch target cache means and said instruction queue means and responsive to said at least representations of program instructions stored within said instruction queue for determining whether or not to store data within said branch target cache concerning a branch instruction fetched by said instruction fetching circuit, wherein said control means is responsive to said at least representations of program instructions stored within said instruction queue means to determine if a storage condition is met and:

(i) if said storage condition is met, then said control means is configured to trigger said branch target cache means to store said data concerning said branch instruction fetched by said instruction fetching circuit means;

(ii) if said storage condition is not met, then said control means is configured not to trigger said branch target cache means to store said data concerning said branch instruction fetched by said instruction fetching means; and wherein said control means at least partially identifies said at least representations of program instructions stored within said instruction queue means and at least estimates an execution time thereof and said storage condition corresponds to said execution time for said at least representations of program instructions within said instruction queue means being less than a threshold time.

25. A method of processing data processing data, said method comprising the steps of:

fetching program instructions to be executed;

storing at least representations of said program instructions within an instruction queue;

further processing said stored at least representations of program instructions;

in response to a memory address associated with a program instruction fetched, identifying said program instruction as a previously encountered branch program instruction and accessing data concerning said previously encountered branch instruction; and in response to said at least representations of program instructions stored, determining whether or not to store data concerning a branch instruction fetched;

wherein in response to said at least representations of program instructions stored within said instruction queue, determining if a storage condition is met and:

(i) if said storage condition is met, then triggering storing of data concerning said branch instruction fetched by said instruction fetching circuit;

(ii) if said storage condition is not met, then not triggering storing of data concerning said branch instruction fetched by said instruction fetching circuit, and wherein said determining at least partially identifies said at least representations of program instructions stored within said instruction queue and at least estimates an execution time thereof and said storage condition corresponds to said execution time for said at least representations of program instructions within said instruction queue being less than a threshold time.

26. A method as claimed in claim 25, wherein said data is stored within a branch target instruction cache configured to store one or more program instructions starting from a target address of said previously encountered branch instruction, said one or more program instructions being supplied from said branch target instruction cache for said further processing following said previously encountered branch instruction.

27. A method as claimed in claim 26, wherein said one or more program instructions are supplied for said further processing via said instruction queue.

28. A method as claimed in claim 25, wherein said data is stored within a branch target address cache configured to store a target address of said previously encountered branch instruction, said target address used to direct fetching of program instructions to said target address following said previously encountered branch instruction.

29. A method as claimed in claim 25, wherein data concerning a plurality of previously encountered branch instructions is stored.

30. A method as claimed in claim 25, wherein blocks of program instructions are fetched and said memory address is associated with a block of program instructions and identifies that said block of program instructions contains a previously encountered branch instruction.

31. A method as claimed in claim 30, wherein an index value is stored indicating a position within said block of program instructions of said previously encounter branch instruction.

32. A method as claimed in claim 25, wherein said further processing supports multiple instruction issue and said estimating at least estimates which at least representations of program instructions stored within said instruction queue will be issue together when estimating said execution time.

* * * * *